Jan. 28, 1936. E. O. FESSLER 2,028,972
CONDUIT CLEANING APPARATUS
Filed Nov. 19, 1934 2 Sheets-Sheet 2
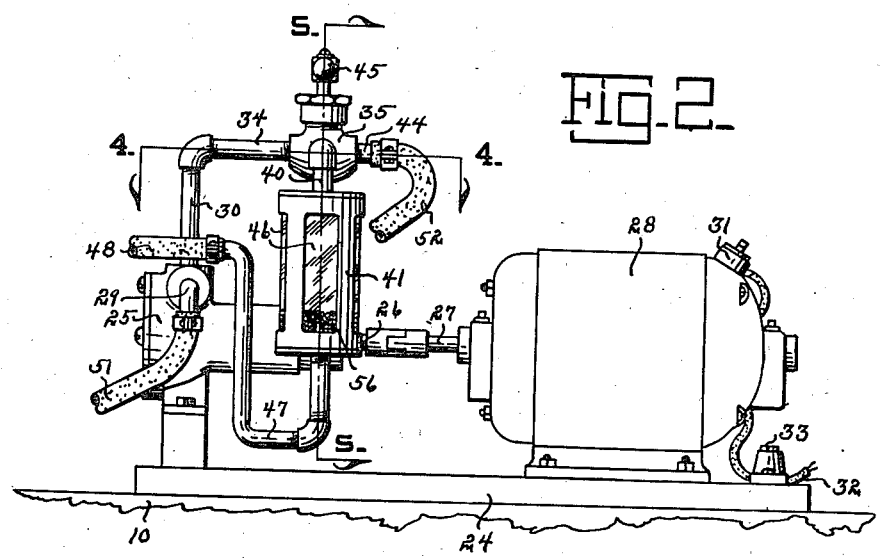
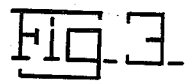
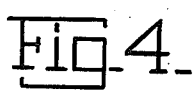
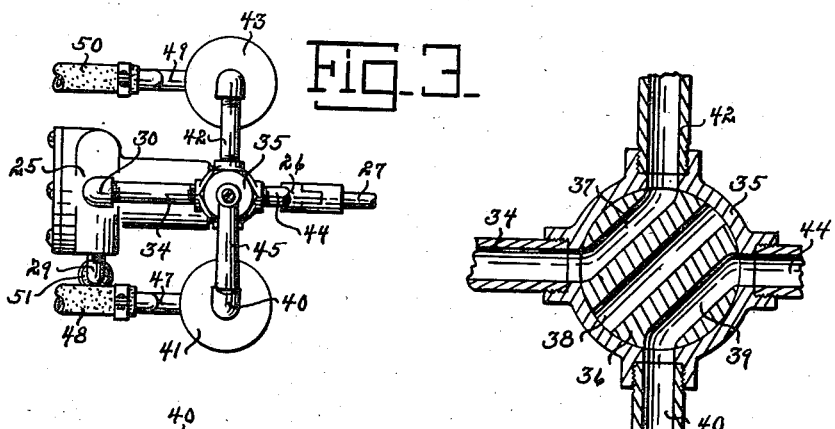
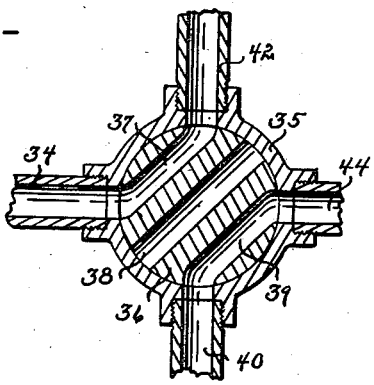
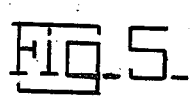
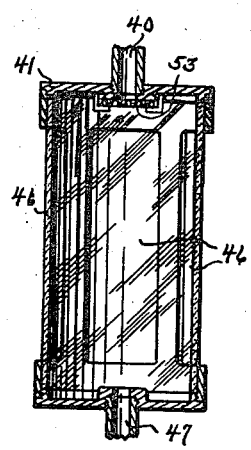
INVENTOR.
E. O. FESSLER
BY M. Talbert Dick
ATTORNEY.

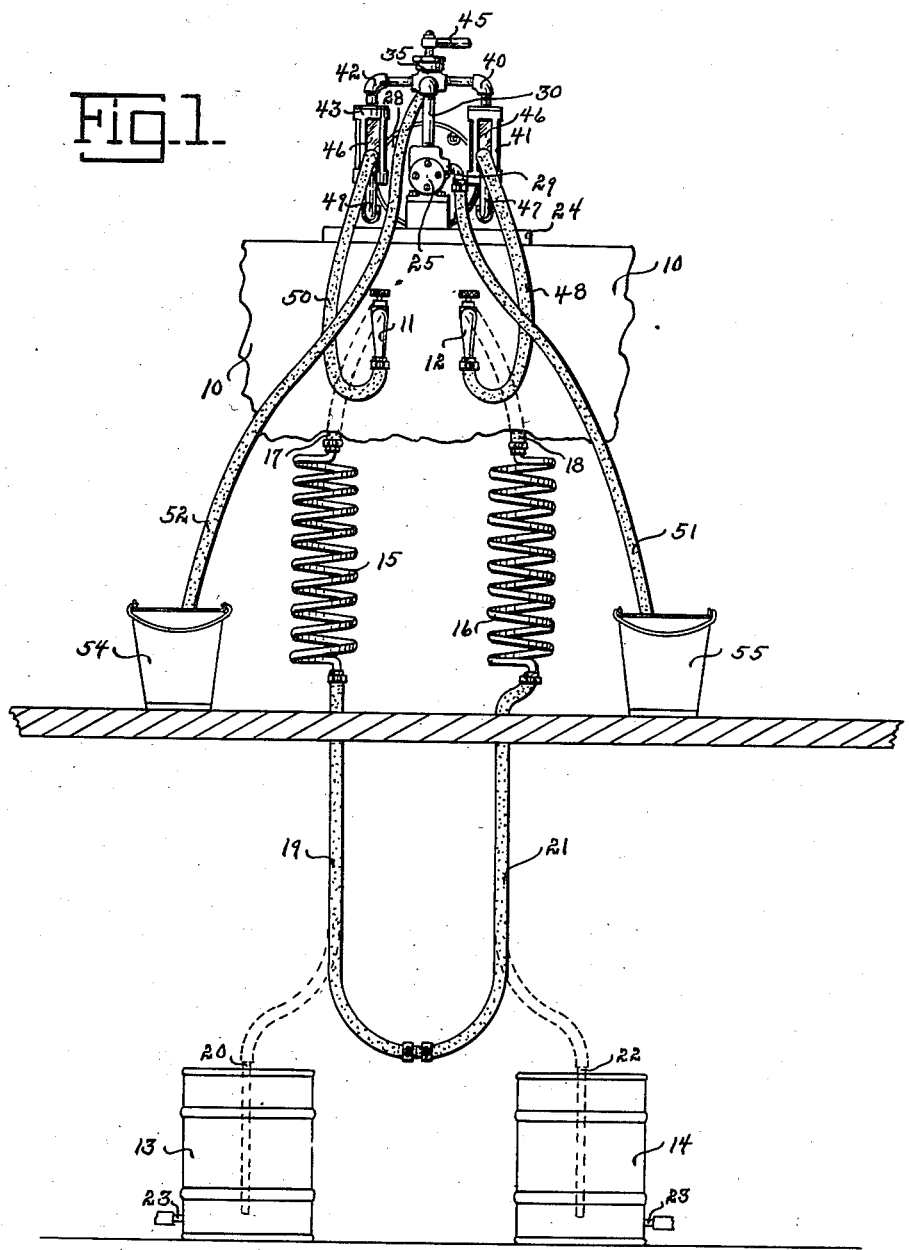

Patented Jan. 28, 1936

2,028,972

UNITED STATES PATENT OFFICE 2,028,972

CONDUIT CLEANING APPARATUS

Elmer Otto Fessler, Des Moines, Iowa

Application November 19, 1934, Serial No. 753,698

2 Claims. (Cl. 225—12)

The principal object of my invention is to provide a portable apparatus for cleaning conduits such as beer cooling coils, beverage fountain tubes, pipes, and like that is easily operated and does not require city water pressure for its functioning.

A further object of this invention is to provide a conduit cleaning apparatus that may use both granular abrasives and liquid cleaning and sterilizing solutions as cleaning agents.

A still further object of my invention is to provde a tube or like cleaning apparatus that is capable of forcing the cleaning agent in either direction through the tube to be cleaned, thereby making it possible to force the agent alternately as to direction through the tube to be cleaned.

A still further object of my invention is to provide a conduit cleaning apparatus using granular material as one of the cleaning agents, that automatically retrieves the granular material being used and keeps the same in a clean condition.

A still further object of my invention is to provide a conduit cleaning apparatus that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is an end view of my complete device in use cleaning two beer cooling coils.

Fig. 2 is a side view of my apparatus ready for use.

Fig. 3 is a top plan view of a portion of my apparatus and more fully illustrates its construction.

Fig. 4 is an enlarged cross-sectional view of the three-way manually operated valve and is taken on line 4—4 of Fig. 2.

Fig. 5 is an enlarged side-sectional view of one of the granular material jars and is taken on line 5—5 of Fig. 2.

The cleaning of the inside of coils is a very difficult task. Perhaps in the beverage dispensing field the necessity of periodically cleaning the cooling tubes, pipes, and like is most pronounced. In this field the conduits must be cleaned in the shortest possible time in order that the dispensing equipment (which is constantly being used) will not be out of order for any substantial period. Although my device may be used in other fields, it is particularly adapted to beverage dispensing equipment.

Referring to the drawings, I have used the numeral 10 to designate an ordinary dispensing counter having the two beverage faucets 11 and 12. The numerals 13 and 14 designate two barrels designed to contain the beverage to be dispensed. The numerals 15 and 16 designate two ordinary cooling coils designed to extend through an ice or refrigerator box. The numeral 17 designates a tube having one end connected to the upper end of the coil 15 and its other end connected to the faucet 11.

The numeral 18 designates a similar tube connecting the upper end of the coil 16 with the faucet 12. The numeral 19 designates the usual flexible hose having its upper end connected to the lower end of the coil 15 and its other end designed to be connected to the pipe 20 extending downwardly in the barrel 13. The numeral 21 designates a similar flexible hose having its upper end connected to the lower end of the coil 16 and its other end designed to be connected to the pipe 22 extending downwardly in the barrel 14. The numeral 23 designates an air tube extending into each of the barrels 13 and 14 designed to be in communication with a source of air under pressure at times. It is such installations that are easily cleaned by my apparatus and which I will now describe.

The numeral 24 designates the base of my apparatus. Mounted on this base is an ordinary standard liquid pump 25. The shaft 26 of this pump is operatively connected to the armature shaft 27 of an electric motor 28 which is also mounted on the base 24, as shown in Fig. 2. The numeral 29 designates the inlet pipe of the pump and the numeral 30 the pump outlet pipe. The numeral 31 designates the electric motor switch. Imposed in the electric lead wire 32 leading to the motor is a fuse 33. The numeral 34 designates a supporting and communicating pipe having one one attached to the pipe 30 and its other end attached to and communicating with the forward side of the housing 35 of the three-way manually operated valve, as shown in the drawings. The numeral 36 designates the rotatable portion of the valve inside the housing 35. This rotatable portion has the three passageways 37, 38, and 39, as shown in Fig. 4. The numeral 40 designates an L-pipe secured to and communicating with the left inside of the valve housing 35. The numeral 41 designates a material jar having its upper end secured to and communicating with the lower end portion of the pipe 40.

The numeral 42 designates a similar L-pipe, but secured to and communicating with the right inside of the valve housing 35. This L-pipe 42 supports a duplicate material jar 43. The numeral 44 designates a drain pipe secured to and communicating with the rear inside of the valve housing 35. The numeral 45 designates the handle member of the manually operated valve for rotating the member 36 to various positions. By the use of this handle 45 it is possible to rotate the member 36 to a position where the passageway 37 communicates with the pipes 34 and 32 and the passageway 39 communicates with the pipes 40 and 44. By further rotation of the handle 45 the member 36 may be rotated to a position where the passageway 38 communicates with the pipes 34 and 44. A further rotation of the handle 45 will rotate the member 36 to a position where the passageway 39 will communicate with the pipes 34 and 40 and the passageway 37 will communicate with the pipes 42 and 44.

In order that the contents in the jars 41 and 43 are visible, I have provided longitudinal glass windows 46 in each of these vertical jars. The numeral 47 designates a vertical U-pipe having one of its ends communicating with the inside bottom of the jar 41 and its other end terminating at a point a substantial distance above the bottom of the jar, as shown in Fig. 2. The numeral 48 designates a flexible hose having one end connected to the free end of the U-pipe 47. The numeral 49 designates a vertical U-pipe having one of its ends communicating with the inside bottom of the jar 43 and its other end terminating at a point a substantial distance above the bottom of the jar. The numeral 50 designates a flexible hose having one of its ends connected to the free end of the U-pipe 49. The numeral 51 designates a flexible hose having one end connected to the inlet pipe 29 of the pump.

The numeral 52 designates a flexible hose having one end connected to the outlet pipe 44 of the manually operated valve. The numeral 53 designates a perforated element screening the opening in the top of each of the jars 41 and 43. The numerals 54 and 55 designate bucket or like receptacles that may be used in the operation of the device. The numeral 56 designates granular abrasive material or like for scouring the inside of the tubes to be cleaned.

The practical operation of the device is as follows: If there are two sets of coils and tubes to be cleaned, as shown in Fig 1, the two lengths of flexible hose 19 and 21 are detached from the barrels and coupled together in any suitable manner and the faucets opened. My apparatus is placed adjacent the faucets such as on the counter 10 and the hose 48 connected to the outlet end of the faucet 12. In like manner the hose 50 is connected to the faucet 11. Next, the hose 51 is placed in communication with a liquid such as water, which may be in the container such as the bucket 55. The hose 52 may have its free end communicating with a drain, a receiving container such as the bucket 54, or into the liquid supply bucket or like 55. With the handle member 45 turned to a position where the passageway 38 is in communication with the pipes 34 and 44, the electric motor is turned on by the switch 31. With the handle member 45 in such position the liquid will pass upwardly through the hose 51, through the pump 25, through the valve 35, and downwardly through the hose 52. This may be considered as the inoperative position of the device inasmuch as no cleaning agent is passing through the coils and pipes to be cleaned. However, when quickly turning the handle member 45 to a position where the passageway 39 will be communicating with the pipes 34 and 40, and the passageway 37 will be in communication with the pipes 32 and 44, the liquid from the pump will be directed by the valve directly into the top of the jar 41.

This fluid will naturally pass downwardly through the jar 41 carrying with it the scouring and cleaning agent 56. From the jar 41 the liquid and insoluble material 56 will be forced through the U-pipe 47, through the hose 48, upwardly through the faucet 12, through the pipe 18, through the coil 16, through the hose 21, and upwardly through the hose 19, coil 15, pipe 17, and downwardly through the faucet 11, from which it will pass through the hose 50, through the U-pipe 49, and into the jar 43. As the jar fills with this liquid it will eventually pass upwardly and out of the jar 43, through the L-pipe 42, through the passageway 37 of the valve, out through the pipe 44, and into the waste drain through the pipe 52. Due to the screen or like 53 in the upper portion of each of the jars 41 and 43, the granular material will be retrieved and retained in the jar 43 and only the dirty liquid will pass upwardly and out of the jar 43. It will be found that most of this granular material will go through the tubes in a slug formation, thereby successfully scouring and cleaning the inside of the coils, tubes, and pipes. The machine should continue to operate a certain length of time in the above manner described and after the granular material has been deposited in the jar 43 in order to clean the granular material therein. After this has been accomplished it is then desirable to rotate the handle member 45 to a position where the passageway 37 will be in communication with the pipes 34 and 42 and the passageway 39 will be in communication with the pipes 40 and 44. When the manually operated valve is in this position the liquid from the pump will be forced through the pipe 42 rather than the pipe 40 and the liquid will enter the top of the jar 42, carrying with it the granular material downwardly and through the coils, pipes, and tubes to be cleaned in an opposite direction from that first described. From this, it will be noted that the granular material passes alternately first from one jar to the other jar.

By observing the position and condition of the granular material through the windows of the jars, the operator will be directed in the use of the manually operated valve. If the hose 52 is placed in communication with a source of liquid such as into the bucket 55, the liquid in the bucket will be drawn therefrom and returned continuously, but this might not be desirable in the early stages of cleaning coils as the liquid would become too foul. Usually, the hose 52 should be placed in communication with the drain or another bucket 54 and then if it is later desired to conserve on the liquid in the bucket 55, the hose 52 may be placed in the bucket 55. In any event, as the last phase of the cleaning of the coils, a clean liquid should be run through the coils being cleaned. The progress of the cleaning of the coils may be easily observed by noting the condition of the liquid passing through the jars 41 and 43. The manually operated valve should be operated until the water passing through the coils is quite clear. One of the principal advantages of my apparatus is that the liquid in the bucket 55 may be treated with any suitable antiseptic solution for cleaning and sterilizing the coils. This is not possible in an apparatus where there is no pump 25 and only city water pressure would be used for forcing the granular material 56 through the coils. In some instances it may be desirable for the liquid in the bucket 55 to be treated with a soap or other cleaning agent to aid in the attack on the undesirable foreign matter in the coils.

When it is desired to clean only one coil or like it is merely necessary to connect the free end of the hose 50 to one end of the coil to be cleaned, and connect the free end of the hose 48 to the other end of the coil to be cleaned. The use of the U-pipes 47 and 49 aids in the trapping of the granular material 56. The fuse 33 is a safety measure to take care of any unforeseen jam in the apparatus.

From the foregoing, it will readily be seen that I have provided a very desirable conduit cleaning apparatus and one that can be operated by a single valve lever.

Some changes may be made in the construction and arrangement of my improved conduit cleaning apparatus without departing from the real spirit and purpose of my invention, and it is my intention to cover by my claims any modified forms of structure or use of mechanical equivalents which may be reasonably included within their scope.

I claim:

1. In a conduit cleaning apparatus, a liquid pump having inlet and outlet ports, a jar member designed to contain granular abrasive material at times, a second jar member designed to contain granular abrasive material at times, a perforated straining member in the top of each of said jar members, a flexible hollow element having one of its ends communicating with the inside bottom of said first-mentioned jar and designed to have its other end communicating with one end of the conduit to be cleaned, a second flexible hollow element having one of its ends communicating with the inside bottom of said second jar and designed to have its other end communicating with the other end of the conduit to be cleaned, a liquid supply pipe communicating with the inlet port of said pump, a pipe leading from the outlet port of said pump, a pipe communicating with the inside top of said first-mentioned jar, a pipe communicating with the inside top of said second jar, a waste pipe, and a multi-way operated valve connected to said last-mentioned four pipes capable of being placed in positions for selectively connecting said pipe leading from said pump with said waste pipe, for connecting said pipe leading from said pump with the said pipe communicating with the inside top of said first-mentioned jar and said pipe communicating with the inside top of said second jar with said waste pipe, and for connecting said pipe communicating with the inside top of said second jar with said pipe leading from said pump and said pipe leading from the inside top of said first-mentioned jar with said waste pipe.

2. In a conduit cleaning apparatus, a liquid pump having inlet and outlet ports, a jar member designed to contain granular abrasive material at times, a second jar member designed to contain granular abrasive material at times, a perforated straining member in the top of each of said jar members, a flexible hollow element having one of its ends communicating with the inside bottom of said first-mentioned jar and designed to have its other end communicating with one end of the conduit to be cleaned, a second flexible hollow element having one of its ends communicating with the inside bottom of said second jar and designed to have its other end communicating with the other end of the conduit to be cleaned, a liquid supply pipe communicating with the inlet port of said pump, a pipe leading from the outlet port of said pump, a pipe communicating with the inside top of said first-mentioned jar, a pipe communicating with the inside top of said second jar, a waste pipe, a multi-way operated valve connected to said last-mentioned four pipes capable of being placed in positions for selectively connecting said pipe leading from said pump with said waste pipe, for connecting said pipe leading from said pump with the said pipe communicating with the inside top of said first-mentioned jar and said pipe communicating with the inside top of said second jar with said waste pipe, and for connecting said pipe communicating with the inside top of said second jar with said pipe leading from said pump and said pipe leading from the inside top of said first-mentioned jar with said waste pipe, and a prime mover operatively connected to said liquid pump for actuating the same.

ELMER OTTO FESSLER.